(12) United States Patent
Yoshida

(10) Patent No.: US 6,341,294 B1
(45) Date of Patent: *Jan. 22, 2002

(54) IMAGE PROCESSING APPARATUS FOR RETRIEVING MOVING IMAGE DATA

(75) Inventor: Tadashi Yoshida, Ichikawa (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/489,635

(22) Filed: Jun. 12, 1995

(30) Foreign Application Priority Data

Jun. 14, 1994 (JP) .............................. 6-131821

(51) Int. Cl.[7] .............................................. G06F 17/21
(52) U.S. Cl. .................................. 707/501.1; 707/500.1
(58) Field of Search .................................. 395/762, 806, 395/807, 173, 174, 327; 345/121, 122, 327, 302, 473, 328, 474, 348, 349; 348/7, 8, 10, 12; 707/501, 104, 500.1, 501.1

(56) References Cited

U.S. PATENT DOCUMENTS 5,524,195 A * 6/1996 Clanton, III et al. ........ 395/327

OTHER PUBLICATIONS

QuickTime, Inside Macintosh, Addison–Wesley Publishing Company, 1993, pp. 1–1 to 2–31.*

Macromind Mediamaker, User Guide, MacroMind, Inc, 1990, pp. 32–37.*

* cited by examiner

Primary Examiner—Stephen S. Hong
(74) Attorney, Agent, or Firm—Fitzpatrick, Cella, Harper & Scinto

(57) ABSTRACT

An image processing apparatus includes a moving image input unit for inputting a plurality of moving image data, a forming unit for forming still image data associated with the moving image data, and a retrieval unit for retrieving desired moving image data on the basis of the still image data formed by the forming unit. An image processing apparatus includes a moving image input unit for inputting moving image data, a still image input unit for inputting a still image, a storage unit for storing the moving image upon associating the image with the still image, and a reproduction unit for reproducing the moving image on the basis of the still image.

10 Claims, 6 Drawing Sheets

| 0 | 1 |
|---|---|
| 2 | 3 |
| 4 | 5 |
| 6 | 7 |

IMAGE PROCESSING APPARATUS FOR RETRIEVING MOVING IMAGE DATA

BACKGROUND OF THE INVENTION

1. Field of the Invention

The present invention relates to an image processing apparatus and, more particularly, to retrieval of moving image data.

2. Related Background Art

With the recent advances in high-speed computers and large-capacity memories, a great deal of attention has been paid to techniques of processing digital moving images with computers as multimedia techniques.

Compression techniques are indispensable for processing moving images because of their enormous data amounts.

As a moving image compression scheme which has recently been standardized, MPEG 1 (Moving Picture Image Coding Expert Group Phase 1) is available.

The principle of a high-efficiency coding scheme based on MPEG will be described below.

In this high-efficiency coding scheme, redundancy in the time-axis direction is reduced by calculating differences between frames, and the resultant difference data is subjected to DCT (Discrete Cosine Transform) and variable-length coding processing to reduce redundancy in the spatial direction, thereby realizing high-efficiency coding as a whole.

With regard to redundancy in the time-axis direction, since there is a high correlation between consecutive frames of moving images, the redundancy can be reduced by calculating differences between a frame to be encoded and a preceding or succeeding frame.

In addition, according to MPEG, the redundancy is further reduced by motion compensation.

More specifically, differences between a macro-block corresponding to a target frame and each of macro-blocks near a block corresponding to a preceding or succeeding frame are calculated in units of a predetermined number of blocks (in units of macro-blocks), providing that each block consists of (8×8) pixels and each macro-block consists of four blocks of luminance data and two blocks of color difference data. A macro-block exhibiting the minimum differences is then searched out to detect a motion vector. This motion vector is encoded as data.

In a decoding operation, the macro-block data corresponding to the preceding or succeeding frame is extracted by using this motion vector, thereby decoding the data encoded by using motion compensation. The size of an image to be encoded is based on an SIF format, i.e., 360 pixels×240 lines for a luminance signal, and 180 pixels×120 lines for a chrominance signal.

MPEG 1 is used to display reproduced images while decoding moving image data compressed/stored as codes in a CD-ROM or the like in real time.

Owing to high compression efficiency, applications of MPEG 1 to a coding scheme for storing various moving image data in the hard disk of a computer, a magneto-optical disk, and the like have been proposed.

In general, a name is assigned to each sequence of stored moving images to manage each moving image.

A search for a sequence corresponding to a given name is made as needed, and the corresponding codes are reproduced/displayed on a computer display.

The following problems are posed in the above prior art in managing moving images by assigning a name to each sequence:

(1) Since the number of characters of a name is limited because of the limitation of a database or the like, it is difficult for a user to assign a name which allows easy retrieval.

(2) It is difficult for the user to retrieve a sequence by a name assigned by another person, retrieval must be performed by reproducing sequences at random.

SUMMARY OF THE INVENTION

The present invention has been made in consideration of the above situation, and has as its object to provide an image processing apparatus which improves the retrieval efficiency of moving image data and the operability in retrieving the data.

In order to achieve the above object, according to an aspect of the present invention, there is provided an image processing apparatus comprising moving image input means for inputting a plurality of moving image data, forming means for forming still image data associated with the moving image data, and retrieval means for retrieving desired moving image data on the basis of the still image data formed by the forming means.

According to another aspect of the present invention, there is provided an image processing apparatus comprising moving image input means for inputting moving image data, still image input means for inputting a still image, storage means for storing the moving image upon associating the image with the still image, and reproduction means for reproducing the moving image on the basis of the still image.

Other objects, features and advantages of the invention will become apparent from the following detailed description taken in conjunction with the accompanying drawings.

BRIEF DESCRIPTION OF THE DRAWINGS

FIG. 4 is a view for explaining the concept of moving image management on the hard copy basis in the embodiment;

DETAILED DESCRIPTION OF THE PREFERRED EMBODIMENTS

Figure 1:
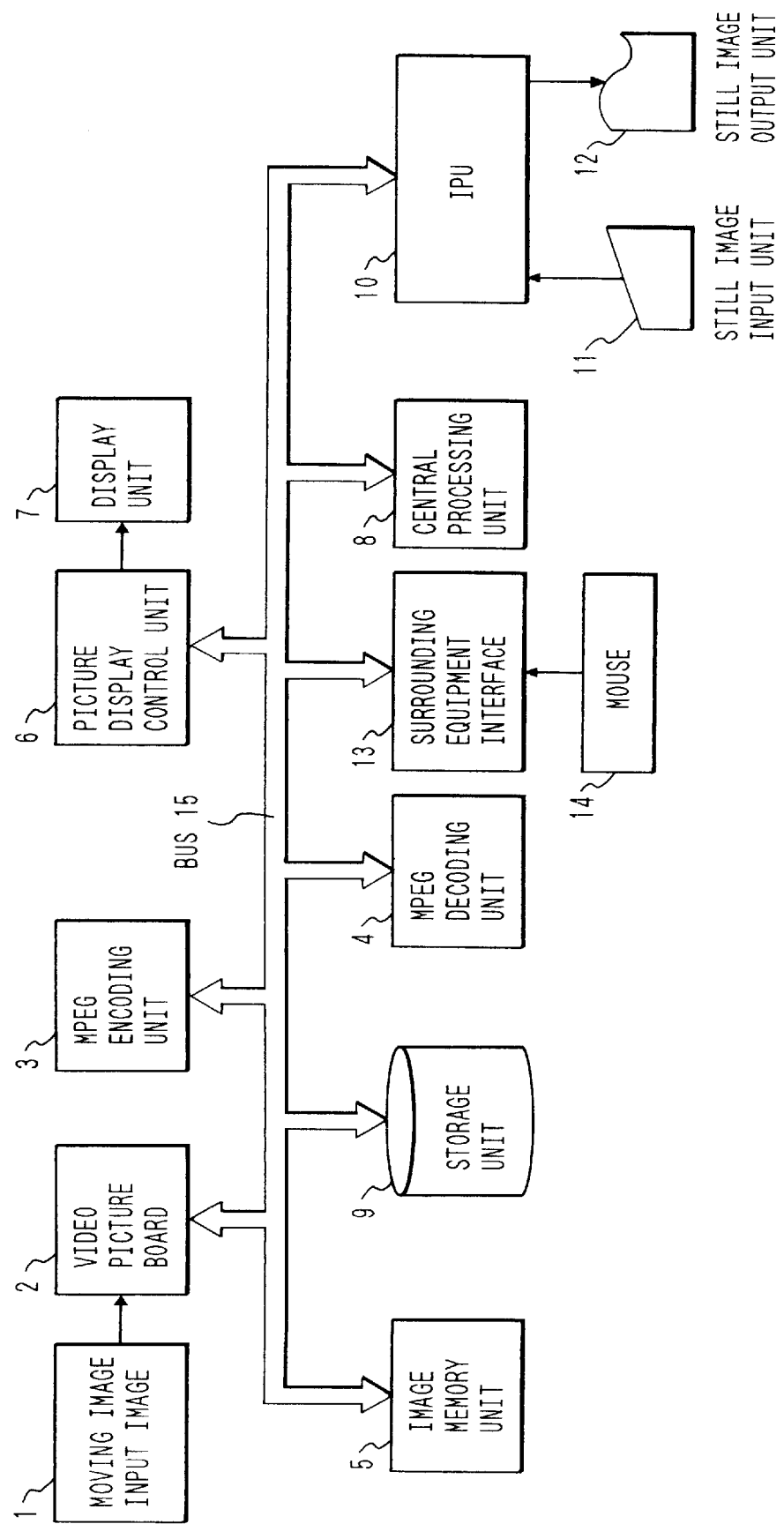
FIG. 1 is a block diagram showing the arrangement of an image processing system according to an embodiment of the present invention.

FIG. 1 shows the arrangement of an image processing system based on a computer according to an embodiment of the present invention.

Referring to FIG. 1, a moving image input unit (e.g., a video camera) 1 serves to input moving image data.

A video picture board 2 serves to convert a video signal output from the moving image input unit 1 into digital image data in the SIF (Source Input Format) format.

An MPEG encoding unit 3 performs compression processing described in "Description of the Related Art". An MPEG decoding unit 4 decodes image data compressed by the MPEG compression technique.

An image memory unit 5 is a unit for storing image data to be displayed or an image being processed.

A picture display control unit 6 serves to display a plurality of images in various sizes on the screen. The picture display control unit 6 extracts image data from the image memory unit 5, forms a frame, and outputs it to a display unit 7.

A central processing unit (CPU) 8 performs overall control of the respective units, and controls the flow of information.

A storage unit (e.g., a disk) 9 is a unit for storing information and programs which are used by the central processing unit 8 or compressed image data.

An image processing unit (IPU) 10 is a unit for exchanging data between, e.g., a still image input unit (e.g., a color scanner) 11 for inputting a still image and a still image output unit (e.g., a color printer) 12 for outputting a still image.

A surrounding equipment interface 13 is a unit for exchanging information with a position information input means such as a mouse 14. As surrounding equipment, a keyboard and the like may be used.

The respective units are connected to each other via a bus 15.

In this embodiment, the moving image input unit 1, the still image input unit 11, the still image output unit 12, and the mouse 14 are arranged as external equipment, and other equipment may include a computer. However, the present invention is not limited to this arrangement. For example, the IPU may be arranged as an external device, and various combinations of equipment are conceivable.

A management system for moving image data in the system having the above arrangement will be described below.

Information for retrieving a moving image sequence input from the moving image input unit 1 is read by the color scanner 11 with a high precision, and the read image is supplied, as a color still image, to the bus 15 via the IPU 10. In this embodiment, this image is read by the color scanner 11 at a resolution of 400 dpi.

The management system for the moving image data input by the image processing system having the above arrangement in this embodiment will be described below.

Figure 2:
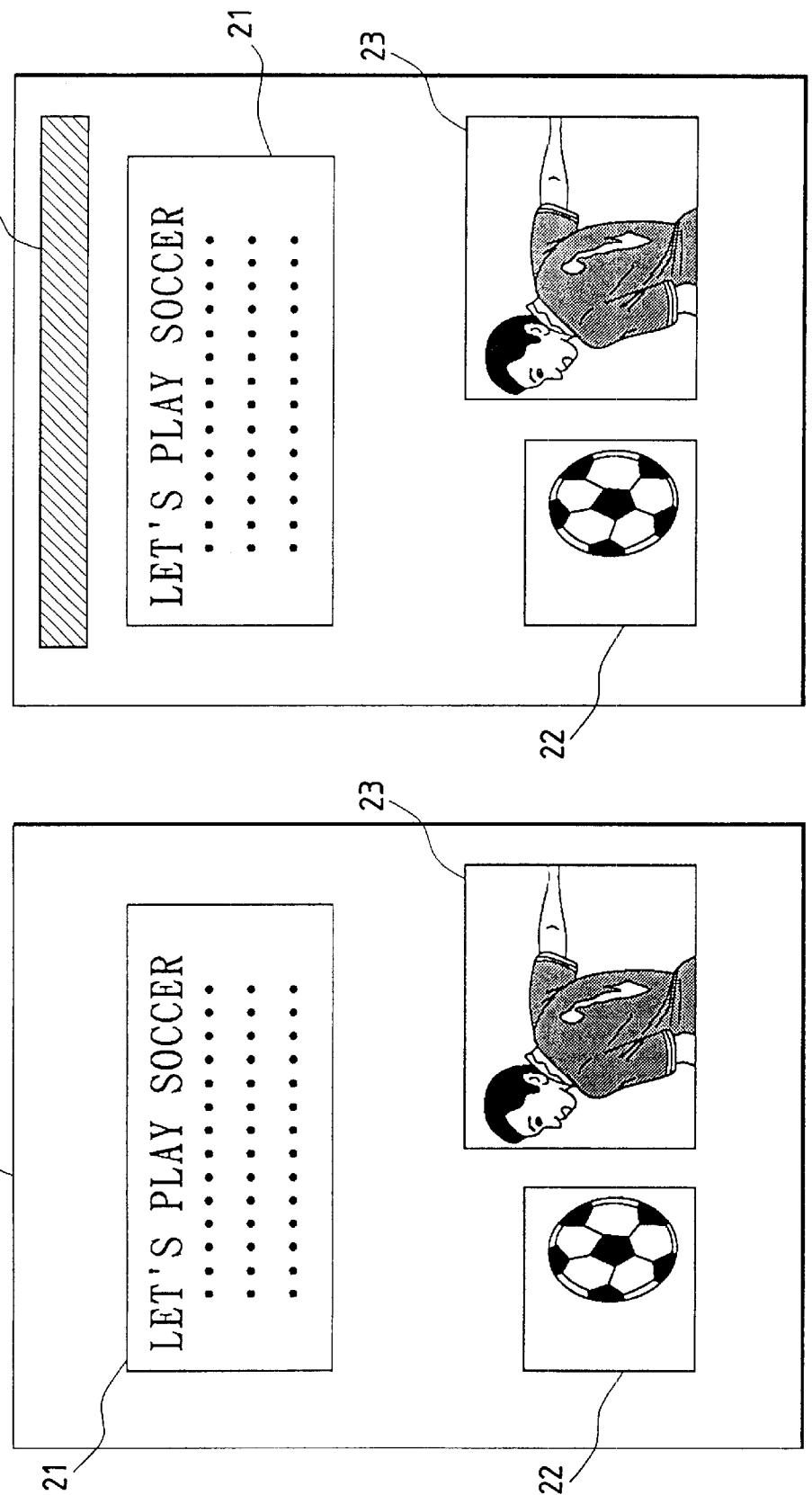
FIG. 2 is a view showing a still image for moving image retrieval in the embodiment.

FIG. 2 is a view for explaining a management method of this embodiment.

The image shown in FIG. 2 is a color image (retrieval still image data) read by the color scanner 11.

Retrieval can be effectively performed if retrieval still image data 20 includes an area 21 for showing a sentence and a title, which explain a moving image sequence to be retrieved, and an area 22 for showing an illustration.

An area 23 shows the head frame or a typical frame, embedded as a still image, of a moving image sequence to be retrieved. That is, the area 23 is further linked with the moving image sequence to be retrieved.

In this embodiment, an inter-application linking function called an OLE™ (Object Linking and Embedding) function in Windows™ available, as an OS (Operating system) of a PC (Personal Computer) from Microsoft Corporation is applied to moving image retrieval.

The OLE function will be briefly described below.

This function is designed to provide a means for forming a compound document, i.e., a document including not only a text but also graphic data, speech data, or image data, by using a plurality of applications.

If a document is to be constituted by different types of data by exchanging the data between applications, a data exchange method using a clipboard is sufficient for such a document.

In this case, exchanged data cannot be corrected afterward. With the OLE function, however, such data can be corrected afterward. If, for example, double-clicking is performed at a position corresponding to a graphic pattern pasted on a document, graphic pattern drawing software for forming the graphic pattern is activated to allow correction of the graphic pattern. A corrected portion is reflected in the graphic pattern pasted on the document.

In the present invention, a still image is linked with a moving image by using this OLE function. More specifically, when a portion corresponding to the area 23 is indicated by a pointer, and double-clicking is performed, the corresponding moving image software is activated to reproduce the moving image data.

The retrieval still image data 20, like the one shown in FIG. 2, is formed for each sequence of moving image data and is stored in the storage unit 9.

When a moving image retrieval mode is designated by the user with an operation unit (not shown), the CPU 10 searches the storage unit 9 to form a list of retrieval still image data stored therein, and displays retrieval image data 30 (see FIG. 3) on the display unit 7.

Assume that a desired image of the retrieval image data 30 is indicated by a pointer 32 with the mouse 14. In this case, when a selecting operation is performed, the retrieval image data 30 indicated by the pointer is enlarged/displayed as a display image 31 in accordance with the size of the display unit 7. The display image 31 can be made to overlap another image, as if paper sheets are made to overlap each other, under the control of the picture display control unit 6. In addition, the respective display portions (e.g., the retrieval image data 30 and the display image 31) can be displayed in arbitrary places and arbitrary sizes within the range of the screen, and the enlargement/reduction ratio and display range of the display screen can be changed within a predetermined range.

In this embodiment, the desired retrieval image data 30 is selected by operating the pointer 32 indicated on the display screen of the display unit 7 with the mouse 14. However, such data can be selected by directly inputting a number or the like with a keyboard.

In this manner, retrieval of a moving image is performed first through the still image data of compressed images.

Figure 3:
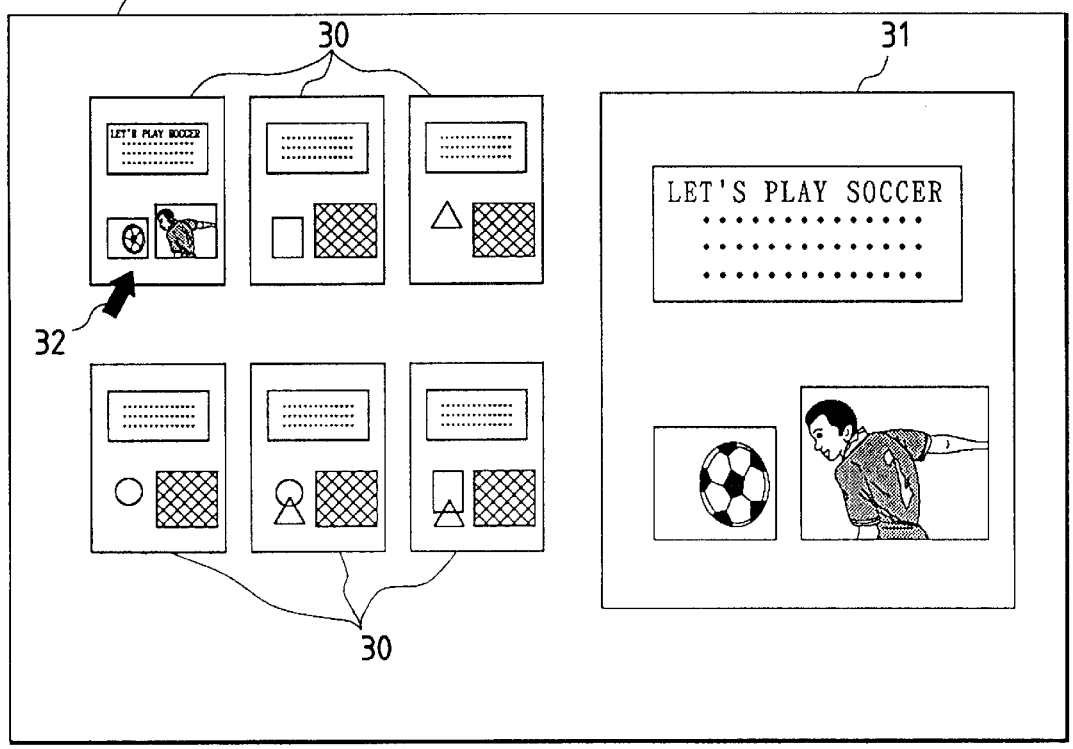
FIG. 3 is a view for explaining a moving image retrieval method in the embodiment.

When the retrieval still image data 30 including desired moving image data is retrieved in the case shown in FIG. 3, the moving image is displayed as follows.

As described above, the area 23 is associated with the still image of the retrieval still image data 20 (see FIG. 2). In this embodiment, the area 23 is embedded in the retrieval still image data 20 by using the OLE function in Windows™ by Microsoft Corporation.

When double-clicking is performed at a position corresponding to the area 23, the moving image software is activated to reproduce the moving image data.

This moving image data can be enlarged/reproduced as needed.

Furthermore, the retrieval still image data 20 (see FIG. 2) including one frame of a sequence of moving image data is supplied to the IPU 10 via the surrounding equipment interface 13. Thereafter, this data can be output, as a color image, from the still image output unit 12.

In this embodiment, management of moving images can be performed on the hard copy basis.

This management will be described below with reference to FIG. 4.

FIG. 4 shows the selected retrieval image data 30 as an image output from the still image output unit 12 in FIG. 1.

In this case, the retrieval still image data, the moving image sequence linked therewith, and information indicating the storage location and the like are synthesized, as an enciphered image 40, with a color image output from the still image output unit 12.

Figures 5, 6:
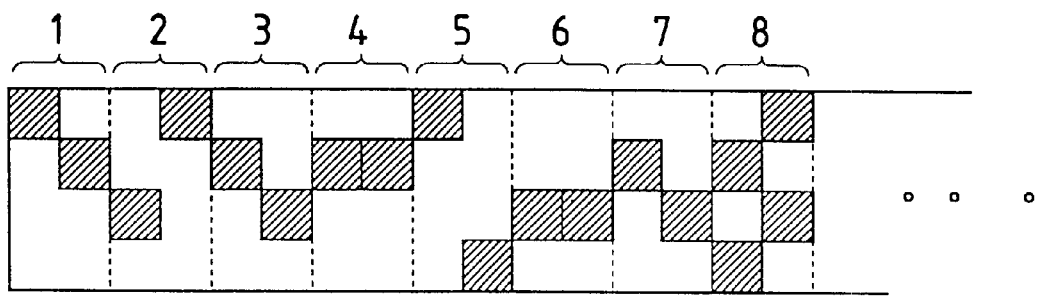
FIG. 5 is a view showing an enciphered image.
FIG. 6 is a view showing the small blocks of the enciphered image.

FIG. 5 shows a view for explaining an enciphered image.

The enciphered image 40 is divided into blocks 1, 2, 3, 4, 5, 6, 7, 8, . . . , and each block is divided into 8 (=2×4) small blocks.

Each small block needs to have a size large enough to allow re-scanning by the scanner 1 in FIG. 1.

In this embodiment, when an image is to be output at a resolution of 400 dpi, the size is set to be 2 mm square (about 32×32 dots).

As shown in FIG. 6, each block is 8-bit information, with the respective small blocks corresponding to bit numbers 0 to 7.

Figure 7:
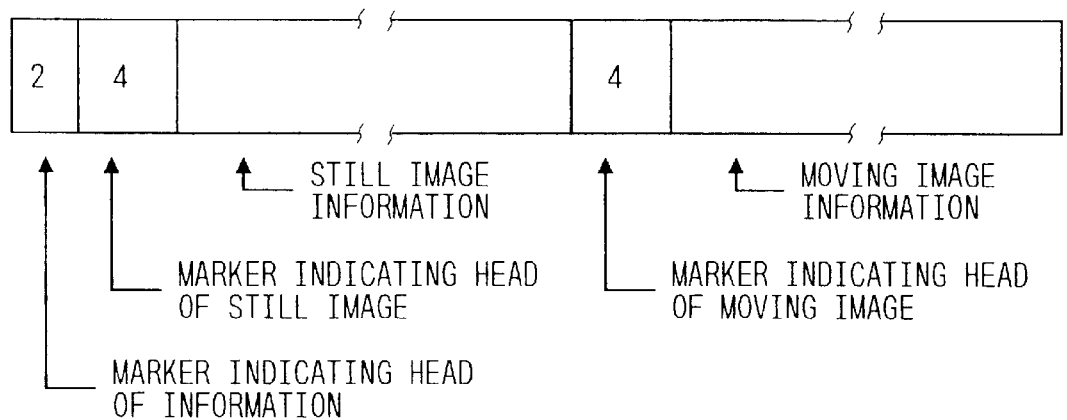
FIG. 7 is a view showing information added to the enciphered image.

FIG. 7 shows an example of information to be added.

Referring to FIG. 7, each number indicates the number of bytes of information.

For example, the first two bytes correspond to two blocks (two 2×4 blocks) in FIG. 5. These two bytes constitute a pattern of a marker indicating the head of the information. In performing re-scanning, this marker indicates whether the information is a pattern of an enciphered image.

The next four bytes constitute a marker indicating still image information. Data indicating still image information follows this marker. For example, this data includes an address indicating the location of a still image in the storage unit 9.

With regard to the linked moving image data, enciphered moving image data follows the four-byte marker indicating the head of the moving image.

As described above, an image obtained by synthesizing retrieval still image data with an enciphered image is output, as a hard copy such as the image shown in FIG. 4, from the color printer 12 in FIG. 1.

When this hard copy is re-scanned by the color scanner 11 in FIG. 1, the enciphered image is analyzed by the CPU 8, and the corresponding retrieval still image data (see FIG. 4) stored in the storage unit 9 is displayed.

Figure 8:
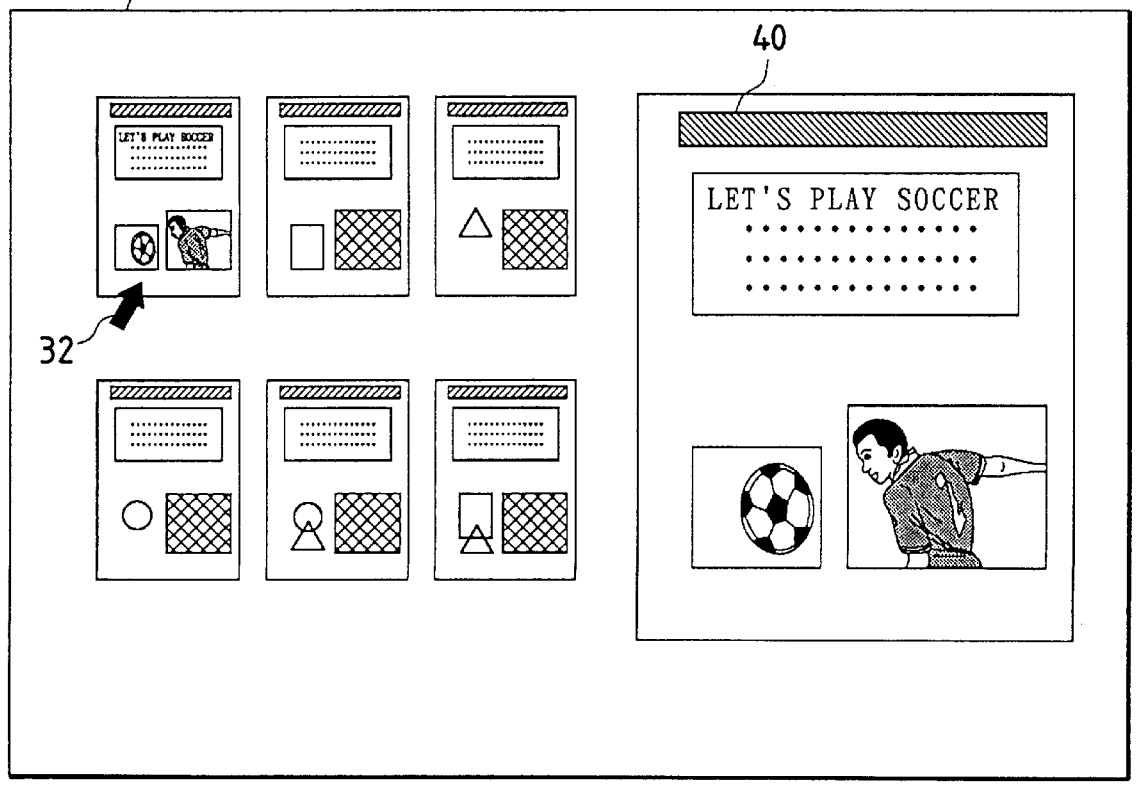
FIG. 8 is a view for explaining a retrieval method using the enciphered image.

Retrieval is performed in the manner described above. In this case, however, enciphered images 40 are respectively added to the compressed images and the enlarged image as retrieval still image data, as shown in FIG. 8.

When one of the enciphered images 40 is clicked and selected with the pointer 32, the information of the enciphered image is displayed.

That is, the linked moving image data is reproduced. Alternatively, the time of photography, date of photography, place of photography, and the like of the moving image data may be displayed.

As described above, the moving image data may be reproduced by indicating the area 23 with the pointer 32 and performing double-clicking.

With the above processing, moving image data can be retrieved on the basis of image data as a hard copy. Therefore, the drawbacks of a conventional moving image database, i.e., a complicated operation and a low retrieval speed, can be eliminated.

In addition, since the user is only required to input still image data, he/she need not perform any cumbersome operation such as assignment of keywords for retrieval.

Furthermore, according to the present invention, since encryption management of moving images is performed by using still images as hard copies, the following advantages are obtained.

(1) The location of a moving image can be easily retrieved at a high speed by re-scanning a hard copy.

(2) Various information about a moving image can also be obtained simultaneously.

Note that retrieval still image data may be formed by computer application software. For example, data such as data of the areas 21 and 22 may be formed by using a wordprocessor and drawing software. With this operation, high-resolution retrieval still image data can be formed.

Figure 9:
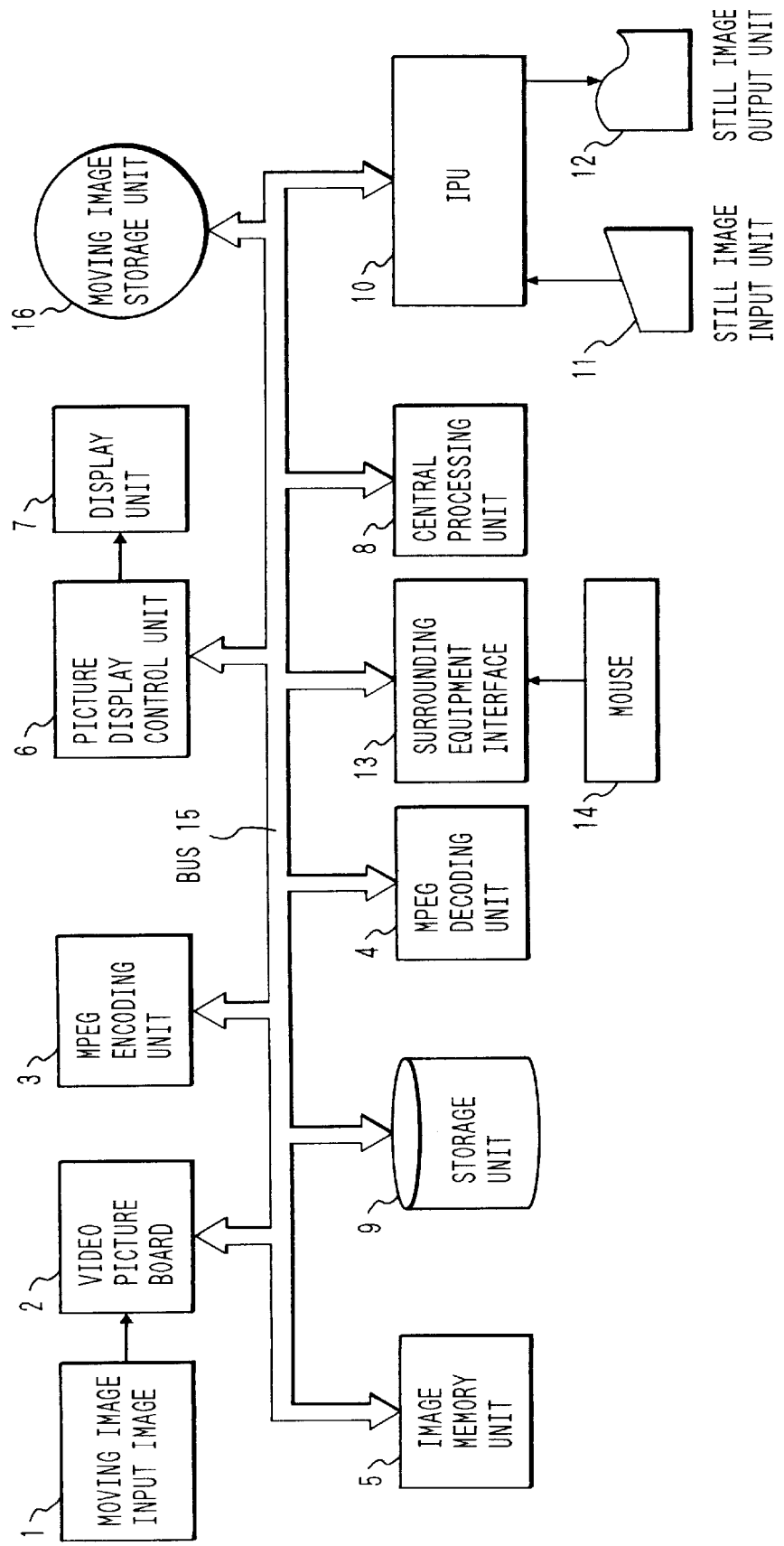
FIG. 9 is a block diagram showing the arrangement of an image processing system according to another embodiment.

In the above embodiment, a moving image from a video camera is input, and retrieval still image data and moving image data are stored, as digital moving image data, in the storage unit 9. However, a moving image storage unit (e.g., a CD-ROM) 16 for storing moving image data may be arranged in the system in FIG. 1 (see FIG. 9).

The moving images stored in the CD-ROM are managed by the following method. In managing still images in the manner shown in FIG. 8 or 9, the still images are linked with the CD-ROM. With this operation, digital moving image data need not be stored in one storage unit 9.

In addition, if information indicating that a moving image is stored in the CD-ROM is embedded in the enciphered image 40, moving image management can be performed on the hard copy basis.

Furthermore, if image data is extracted from the CD-ROM and edited/stored in the disk 6, the same processing as that in the first embodiment can be performed.

As has been described above, according to this embodiment, still image data associated with moving image data is formed, and retrieval of moving image data is performed on the basis of the still image data. Therefore, desired moving image data can be retrieved easily and quickly.

Since the above still image data can be formed by using a computer, DTP, or the like, high-resolution still images can be provided. Even if, therefore, the above still images are reduced or enlarged, good recognizability and a high resolution can be attained.

In addition, information data (e.g., address information indicating the location of moving image data) associated with the moving image data is formed and added to the above still image data. The moving image data can be obtained on the basis of the above data. Therefore, quick retrieval and quick reproduction of the moving image data can be performed.

Furthermore, since the data obtained by synthesizing the above still image data with the above associated information data can be produced as a hard copy, retrieval of moving image data can be performed on the paper sheet basis. Therefore, no complicated operation for retrieval is required, and retrieval can be easily performed.

Moreover, in reproducing the moving image data retrieved by the hard copy, the associated information data added to the hard copy is read, and the moving image data can be reproduced on the basis of the associated information data. Therefore, the retrieval speed can be greatly increased as compared with the prior art.

Various changes and modifications of the embodiments can be made without departing from the spirit and scope of the invention.

For example, the enciphered image shown in FIG. 5 may be a bar code.

In other words, the foregoing description of embodiments has been given for illustrative purposes only and not to be construed as imposing any limitation in every respect.

The scope of the invention is, therefore, to be determined solely by the following claims and not limited by the text of the specification and alterations made within a scope equivalent to the scope of the claims fall within the true spirit and scope of the invention.

What is claimed is:

1. An image processing apparatus for reproducing desired moving image data from a storage medium on which a plurality of moving image data are stored, comprising:

a still image forming unit that forms still image data corresponding to each of the plurality of moving image data;

a retrieval image forming unit that forms retrieval data for retrieving the moving image data based on the still image data formed by said still image forming unit, so that a retrieval image is formed for each of the plurality of moving image data stored in said storage medium and includes therein as an image area a formed still image which corresponds to a moving image of the plurality of moving image data for which the retrieval image is formed;

a display unit that displays a retrieval image which corresponds to the retrieval data formed by said retrieval image forming unit, wherein said display unit displays a plurality of retrieval images simultaneously;

a designation unit that designates a retrieval image displayed by said display unit; and a reproducing unit that reproduces the moving image data which corresponds to the designated retrieval image from the storage medium, wherein said display unit magnifies and displays a retrieval image designated by said designation unit from among the plurality of retrieval images simultaneously displayed by said display unit, and wherein, in response to a further designation by said designation unit, said reproducing unit then reproduces the moving image data corresponding to the magnified retrieval image.

2. Apparatus according to claim 1, wherein the retrieval data includes related data associated with the moving image data.

3. Apparatus according to claim 2, wherein the related data includes data for identifying an address of the storage medium on which the moving image data is stored.

4. Apparatus according to claim 2, further comprising an output unit that outputs a hard copy of a plurality of retrieval images, and an image corresponding to the related data.

5. Apparatus according to claim 1, further comprising an output unit that outputs a hard copy of the retrieval image.

6. Apparatus according to claim 5, further comprising a reading unit that reads the hard copy.

7. Apparatus according to claim 6, further comprising a control unit that controls said reproducing unit so as to reproduce the moving image data according to an output of said reading unit.

8. Apparatus according to claim 1, wherein the moving image data comprises compression-encoded data.

9. An image processing method for reproducing desired moving image data from a storage medium on which a plurality of moving image data are stored, comprising:

a still image forming step of forming still image data corresponding to each of the plurality of moving image data;

a retrieval image forming step of forming retrieval data for retrieving the moving image data, based on the formed still image data formed in said still image forming step, so that a retrieval image is formed for each of the plurality of moving image data stored in said storage medium and includes therein as an image area a formed still image which corresponds to a moving image of the plurality of moving image data for which the retrieval image is formed;

a first display step of displaying a retrieval image which corresponds to the retrieval data formed in the retrieval image forming step, wherein said first display step includes simultaneously displaying a plurality of retrieval images;

a first designation step of designating one of the plurality of retrieval images displayed in said first display step;

a second display step of magnifying and displaying the one retrieval image designated in the first designation step;

a second designation step of confirming a designation of the one retrieval image magnified and displayed in said second display step; and a reproducing step of reproducing from the storage medium the moving image data which corresponds to the retrieval image designated in the second designation step.

10. Apparatus according to claim 8, wherein said reproducing unit includes a decoding unit that decodes the coded moving image data.

* * * * *

UNITED STATES PATENT AND TRADEMARK OFFICE
CERTIFICATE OF CORRECTION

PATENT NO. : 6,341,294 B1
DATED : January 22, 2002
INVENTOR(S) : Tadashi Yoshida It is certified that error appears in the above-identified patent and that said Letters Patent is hereby corrected as shown below:

<u>Title page,</u>
Item [56], References Cited, U.S. PATENT DOCUMENTS, insert
-- 5,550,956 8/1996 Gabbe et al. --.

<u>Column 1,</u>
Line 58, "like" should read -- like, --.

Signed and Sealed this

Twenty-fifth Day of June, 2002

*Attest:*

*Attesting Officer*

JAMES E. ROGAN
*Director of the United States Patent and Trademark Office*